(12) United States Patent
Uezono et al.

(10) Patent No.: US 9,278,402 B2
(45) Date of Patent: Mar. 8, 2016

(54) OUTPUT CONTROL METHOD FOR CONSUMABLE ELECTRODE ARC WELDING POWER SOURCE

(75) Inventors: Toshiro Uezono, Osaka (JP); Tetsuo Era, Osaka (JP)

(73) Assignee: DAIHEN Corporation, Osaka (JP)

( * ) Notice: Subject to any disclaimer, the term of this patent is extended or adjusted under 35 U.S.C. 154(b) by 916 days.

(21) Appl. No.: 11/589,398

(22) Filed: Oct. 30, 2006

(65) Prior Publication Data

US 2007/0102407 A1  May 10, 2007

(30) Foreign Application Priority Data

Nov. 7, 2005 (JP) ................... 2005-321816
Dec. 8, 2005 (JP) ................... 2005-354224
Mar. 20, 2006 (JP) ................... 2006-075818
Jun. 27, 2006 (JP) ................... 2006-176309

(51) Int. Cl.
  *B23K 9/10* (2006.01)
  *B23K 9/073* (2006.01)
(52) U.S. Cl.
  CPC .................. *B23K 9/0731* (2013.01)
(58) Field of Classification Search
  CPC ............ B23K 9/10; B23K 9/09; B23K 9/073
  USPC .................... 219/130.33, 130.1, 130.5, 130.7
  See application file for complete search history.

(56) References Cited

U.S. PATENT DOCUMENTS 3,904,846 A * 9/1975 Risberg .................... 219/130.33
4,427,874 A * 1/1984 Tabata et al. ............. 219/130.51
5,136,139 A * 8/1992 Gilliland ................... 219/137 PS
6,794,608 B2 * 9/2004 Flood et al. ............... 219/130.51
7,105,777 B2 * 9/2006 Stava et al. ............... 219/137.71

FOREIGN PATENT DOCUMENTS

| EP | 0 300 369 | | 1/1989 | |
|---|---|---|---|---|
| JP | 57-19161 | | 2/1982 | |
| JP | 2000-668 | | 1/2000 | |
| JP | 2003-311409 | | 11/2003 | |
| JP | 2003311409 | A * | 11/2003 | ............... B23K 9/09 |
| JP | 2004-82152 | | 3/2004 | |
| JP | 2004-237342 | | 8/2004 | |

(Continued)

OTHER PUBLICATIONS

European Search Report from the corresponding EP 06255619.6-2302, mailed Mar. 8, 2007.

*Primary Examiner* — Dana Ross
*Assistant Examiner* — Ayub Maye
(74) *Attorney, Agent, or Firm* — Hamre, Schumann, Mueller & Larson, P.C.

(57) ABSTRACT

In the output control method for a consumable electrode arc welding power source, entire application range of an welding current is segmentalized into a plurality of current zones, a norm welding voltage value is set for each of the current zones, a welding current and a welding voltage are detected at each of minute cycles, the current zone which corresponds to a detected value of the welding current is selected, a fluctuation range is calculated with the norm welding voltage value of the selected current zone as a center value, a welding voltage limit value is calculated while the welding voltage detected value is limited to within the fluctuation range, and the output of the welding power source is controlled based on this welding voltage limit value.

7 Claims, 18 Drawing Sheets

(56) References Cited

FOREIGN PATENT DOCUMENTS

| JP | 2004237342 A | * | 8/2004 | ............... B23K 9/09 |
| JP | 2005-34853 | | 2/2005 | |
| JP | 2005034853 A | * | 2/2005 | ............... B23K 9/09 |

* cited by examiner

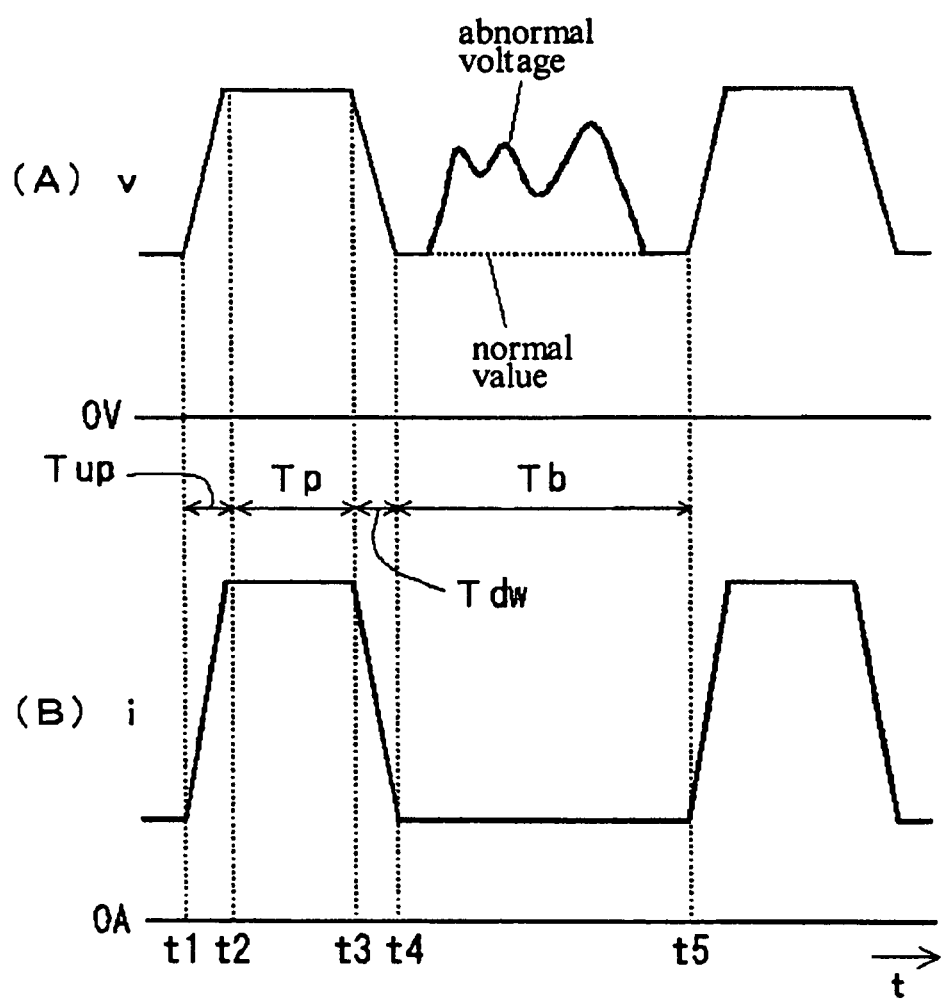
FIG.15 - PRIOR ART

FIG.16 - PRIOR ART
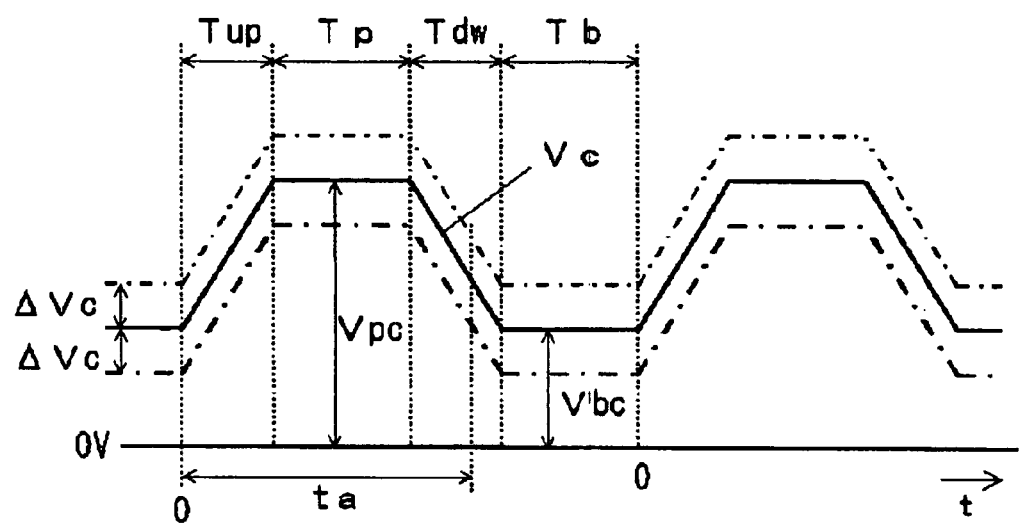

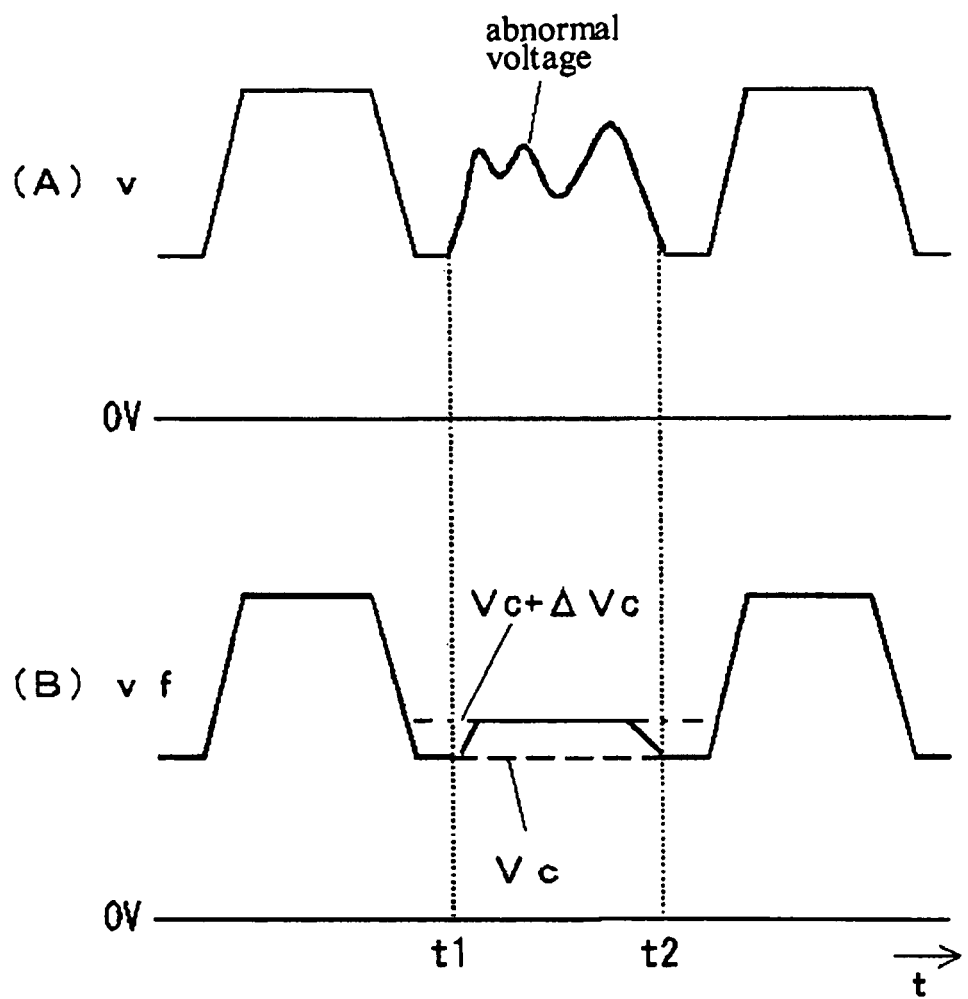
FIG.17 - PRIOR ART

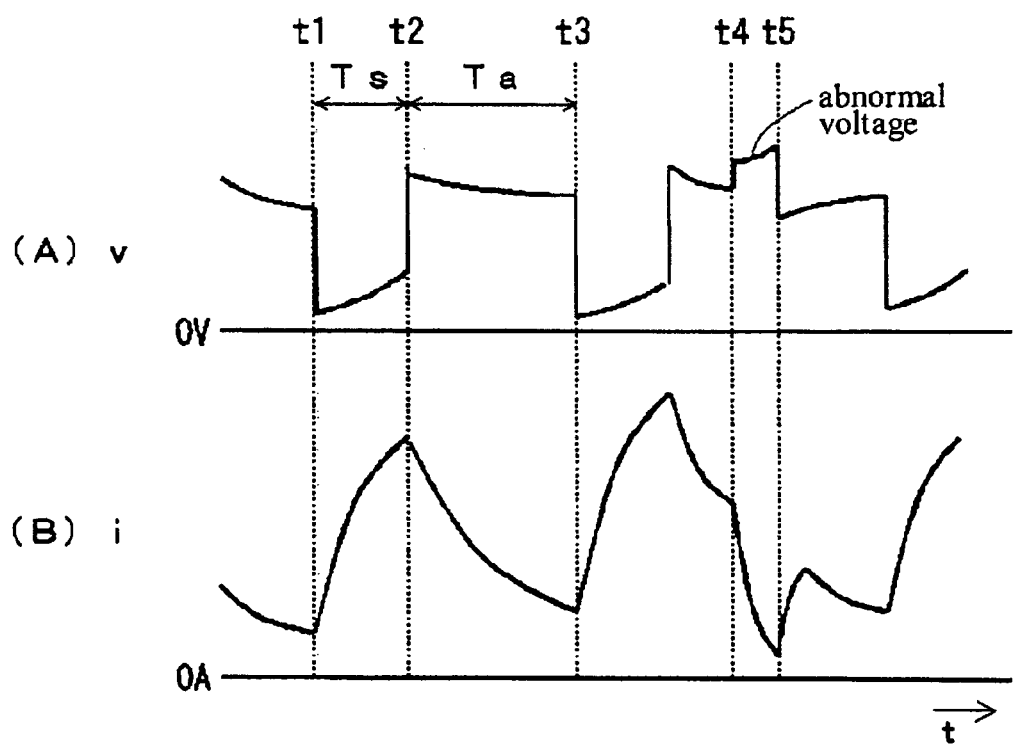
FIG. 18 - PRIOR ART

OUTPUT CONTROL METHOD FOR CONSUMABLE ELECTRODE ARC WELDING POWER SOURCE

BACKGROUND OF THE INVENTION

1. Field of the Invention

The present invention relates to a method for controlling the output from a consumable electrode arc welding power source. In particular, the present invention relates to a method for removing abnormal voltages superposed on the welding voltage, so that the control of the welding power source is performed based on the normalized welding voltage, thereby stabilizing the state of the welding.

2. Description of the Related Art

In consumable electrode arc welding, it is important to maintain an appropriate value of the apparent arc length (hereinafter simply referred to as arc length), which is the shortest distance between the tip of the consumable electrode (hereinafter simply referred to as welding wire) and the base metal, in order to achieve good welding quality. For this purpose, the consumable electrode arc welding power source performs constant-voltage control. The arc length is detected from the welding voltage based on the proportional relation between the arc length and the welding voltage, and the arc length is maintained at an appropriate value by providing an output control so that the welding voltage becomes equal to a preset voltage value that will give the appropriate arc length. In order to achieve stable control on the arc length, highly accurate detection of the arc length must be made from the welding voltage.

Normally, in consumable electrode arc welding, welding is performed in electrode-positive (EP) polarity where an anode point is formed at a tip of the welding wire while a cathode point is formed at the base metal surface, whereby an arc is formed between the anode point and the cathode point. The anode point formed near the tip of the wire migrates very little. On the contrary, the cathode point migrates back and forth on the base metal surface toward regions including oxidized films. The cathode point also migrates due to contamination on the base metal surface, dynamic state of the molten pool, gas discharged from the molten pool, and so on. A momentary change of the position where the cathode point is formed does not cause the change of the apparent arc length. The apparent arc length changes by a very little amount in a short moment which is not greater than several tens of milliseconds because changes of the apparent arc length are caused by the difference between the wire feeding speed and the wire melting speed. However, the migration of the cathode point which can be caused by many factors as described above introduces an abnormal voltage superimposed on the welding voltage. This abnormal voltage does not have any proportional relation with the apparent arc length. Therefore, if the output control is based on the welding voltage on which the abnormal voltage is superimposed, the abnormal voltage destabilizes the arc length control system, leading to decreased welding quality. Abnormal voltage appears more often in MIG welding and MAG welding in which shield gas is mixed with inert gas (such as argon gas and helium gas). Therefore, the abnormal voltage must be removed from the welding voltage in order to stabilize the arc length control. Hereinafter, conventional art for the removal of the abnormal voltage in consumable electrode pulse arc welding will be described (See JP-A 2003-311409 and JP-A 2005-034853).

FIG. 15 is a chart showing voltage and current waveforms in a consumable electrode pulse arc welding. A time course change of the welding voltage v is shown in (A) whereas a time course change of the welding current i is shown in (B). Explanation will be given below with reference to FIG. 15.

During a predetermined peak rise period Tup from time instant t1 to time instant t2, a transient current which rises from a base current to a peak current flows as shown in (B), and a transient voltage which rises from a base voltage to a peak voltage is applied between the welding wire and the base metal as shown in (A). During a predetermined peak period Tp from time instant t2 to time instant t3, a predetermined peak current flows as shown in (B), and a peak voltage is applied as shown in (A). During a predetermined peak fall period Tdw from time instant t3 to time instant t4, a transient current which falls from the peak current to the base current flows as shown in (B), and a transient voltage which falls from the peak current to the base current is applied as shown (A). During a base period Tb from time instant t4 to time instant t5, a predetermined base current passes flows as shown in (B), whereas a base voltage is applied as shown in (A).

As shown in (A), an abnormal voltage which has a greater value than the normal voltage is superimposed on the base voltage during the base period Tb. In pulse arc welding, control is made by varying the length of the base period Tb so that an average value of the welding voltage v would be equal to a preset voltage value. Therefore, if an abnormal voltage is superimposed on the welding voltage v, error is contained in the arc length detection which is performed on the basis of the welding voltage average value, and the error destabilizes the arc length control.

FIG. 16 illustrates a method of setting a norm voltage waveform for removing the abnormal voltage. First, a norm peak voltage value Vpc, a norm base voltage value Vbc and a fluctuation range $\Delta Vc$ for a given set of welding conditions such as the kind of welding wire and wire feeding speed are obtained through e.g. experiments. Then, as shown in FIG. 16, the norm voltage waveform is defined by using the following formulas for each lapse of time t, with the start time point of the peak rise period Tup set to be 0.

(11) $0 \leq t < Tup$ $$Vc = ((Vpc - Vbc)/Tup)t + Vbc \qquad \text{Formula (11)}$$

(12) $Tup \leq t < Tup + Tp$ $$Vc = Vpc \qquad \text{Formula (12)}$$

(13) $Tup + Tp \leq t < Tup + Tp + Tdw$ $$Vc = ((Vbc - Vpc)/Tdw)(t - Tup - Tp) + Vpc \qquad \text{Formula (13)}$$

(14) $Tup + Tp + Tdw \leq t < Tup + Tp + Tdw + Tb$ $$Vc = Vbc \qquad \text{Formula (14)}$$

For example, here it is assumed that the detected value the welding voltage is vd1 [V] when the time ta is lapsed as shown in the figure. Since the lapse of time ta is within the range defined by $Tup + Tp \leq ta < Tup + Tp + Tdw$, the obtained value is assigned to the above formula (13), which will give a center voltage value Vc1 [V] of the norm voltage waveform expressed as follows:

$$Vc1 = ((Vbc - Vpc)/Tdw)(ta - Tup - Tp) + Vpc$$

Therefore, the welding voltage detected value vd1 in the lapse of time ta is limited to within a fluctuation range $Vc1 \pm \Delta Vc$. Specifically, when $vd1 \geq Vc1 + \Delta Vc$, the value is limited to $vd1 = Vc + \Delta Vc$, whereas when $vd1 \leq Vc1 - \Delta Vc$, the value is limited to $vd1 = Vc - \Delta Vc$. Thus, based on the welding voltage limit value vf calculated in this way, the output control of the welding power source is performed.

FIG. 17 is a waveform chart which shows how an abnormal voltage is removed by using the above-described norm voltage waveform. The waveform of the welding voltage v on which an abnormal voltage is superimposed is shown in (A) as described in FIG. 15, whereas the waveform of the welding voltage limit value vf is shown in (B). In the figure, throughout the period excluding the abnormal voltage period from t1 to t2, the welding voltage v is within the fluctuation range Vc±ΔVc from the norm voltage waveform and therefore, the welding voltage limit value vf=v. On the other hand, during the period from t1 to t2, any welding voltage value v which exceeds the norm voltage waveform fluctuation range upper limit value Vc+ΔVc is limited to the upper limit value, i.e. limited to the welding voltage limit value vf=Vc+ΔV as shown in (B). In this way, it is possible to remove the abnormal voltage included in the welding voltage v, and to extract only the voltage which is proportional to the arc length for use in the output control.

According to the conventional technique described above, it is possible to remove abnormal voltages superimposed on the welding voltage value v in pulse arc welding. However, abnormal voltages superimpose on the welding voltage value v not only in pulse arc welding but also in non-pulse welding such as consumable electrode arc welding. Hereinafter, description will cover this case.

FIG. 18 is a chart showing voltage and current waveforms in consumable electrode arc welding. A time course change of a welding voltage v is shown in (A), whereas a time course change of a welding current I is shown in (B). During a short-circuit period Ts between time points t1-t2, the welding voltage v becomes a short-circuit voltage value of a few volts as shown in (A), and the welding current i increases gradually as shown in (B) During the short-circuit period Ts, the arc is not generated and the cathode point is not formed, and thereby no abnormal voltage is generated. Next, during an arc period Ta between time points t2-t3, the welding voltage v becomes an arc voltage value, and the welding current i decreases gradually as shown in (B). An abnormal voltage occurs during the arc period Ta, as illustrated between time points t4-t5. Since the welding power source is under constant-voltage control, occurrence of an abnormal voltage, i.e. a voltage surge, will cause the welding current i to drop sharply as shown in (B). This change of the current can be a trigger for an unstable arc state. The abnormal voltage is caused by the same factors as described for the case of pulse arc welding.

The abnormal voltage removal method according to the conventional technique for pulse arc welding is not applicable to the abnormal voltage in the above-described consumable electrode arc welding. Here is the reason for this: In pulse arc welding, it is possible to set normal values of the welding voltage for the peak period and for the base period in the form of the norm peak voltage value Vpc and the norm base voltage value Vbc. Therefore, it is possible to define a norm voltage waveform by using these values. In consumable electrode arc welding, however, time course change of the welding voltage v during the arc period Ta varies very diversely depending on the arc load. Because of this, it is not possible, unlike in pulse arc welding described with reference to FIG. 16, to set a norm voltage waveform for each time period. Therefore, it has not been possible to remove abnormal voltages included in the welding voltage with the conventional means in consumable electrode arc welding.

SUMMARY OF THE INVENTION

It is therefore an object of the present invention to provide an output control method for a consumable electrode arc welding power source, capable of removing abnormal voltages included in the welding voltage in consumable electrode arc welding, and thereby performing a stable arc length control.

In order to solve the problems described above, a first aspect of the present invention provides an output control method for a consumable electrode arc welding power source in which an output of the welding power source is controlled based on an amplified error value between a predetermined voltage setting value and a welding voltage, wherein an entire application range of a welding current is segmentalized into a plurality of current zones, a norm welding voltage value is set for each of the current zones, a welding current and a welding voltage are detected at each of minute cycles, one of the current zones which corresponds to a value of the detected welding current is selected, a fluctuation range is calculated with the norm welding voltage value of the selected current zone as a center value, a welding voltage limit value is calculated while the detected value of the welding voltage is limited to within the fluctuation range, and the amplified error value is calculated using the voltage setting value and the welding voltage limit value.

Preferably, a moving average of the welding voltage limit values is obtained for each of the current zones for the calculation of the norm welding voltage value for each of the current zones.

A second aspect of the present invention provides an output control method for a consumable electrode arc welding power source in which an output of a welding power source is controlled based on an amplified error value between a predetermined voltage setting value and a welding voltage, wherein a norm characteristic of an arc characteristic curve which indicates a relation between a welding current and a welding voltage during arc generation is set, a welding current and a welding voltage are detected at each of minute cycles, a norm welding voltage value which corresponds to a detected value of the welding current is calculated on the norm characteristic, a fluctuation range is calculated with the norm welding voltage value as a center value, a welding voltage limit value is calculated while the detected value of the welding voltage is limited to within the fluctuation range, and the amplified error value is calculated using the voltage setting value and the welding voltage limit value.

Preferably, an approximating curve is calculated for each of predetermined calculation cycles while welding is performed using operational points data constituted from the detected value of the welding current and the corresponding welding voltage limit value in each of the minute cycles, and the approximating curve is set as the norm characteristic.

Preferably, an output voltage which is a voltage at a point on a output path in the welding power source before the reactor mounted on the output path is detected, a deviation between the detected value of the welding voltage and the welding voltage limit value is calculated, a voltage control setting value is calculated by adding the deviation to the voltage setting value, and the amplified error value is calculated using the voltage control setting value and the detected value of the output voltage.

Preferably, each of the norm welding voltage values in all of the current zones is modified based on a change amount of the voltage setting value in the case that the voltage setting value changes.

Preferably, the norm characteristic is modified toward a direction of a welding voltage axis based on a change amount of the voltage setting value in the case that the voltage setting value changes.

Preferably, the norm characteristic is set differently for a plurality of potions to be welded.

According to the first aspect of the present invention, abnormal voltages superimposed on the welding voltage in consumable electrode arc welding is removed by setting a plurality of current zones and setting a norm welding voltage value and defining a fluctuation range for each of the current zones. By performing an output control of the welding power source based on the welding voltage limit value from which the abnormal voltage has been removed, it is possible to perform a stable arc length control and to obtain good welding quality.

Further, it is possible to calculate and set the norm welding voltage value for each of the current zones automatically by obtaining a moving average of the welding voltage limit values while the welding is performed. This eliminates the need for conducting e.g. experiments in order to set a norm welding voltage value. Moreover, since it is possible to calculate an optimum norm welding voltage value under a given welding conditions, the arc length control becomes even more stable.

According to the second aspect of the present invention, abnormal voltages superimposed on the welding voltage in consumable electrode arc welding is removed by setting an approximating curve as a norm characteristic of the arc, calculating a norm welding voltage value from the approximating curve and defining a fluctuation range. By performing an output control of the welding power source based on the welding voltage limit value from which the abnormal voltage has been removed, it is possible to perform a stable arc length control and to obtain good welding quality.

Further, it is possible to calculate and set the approximating curve automatically by using data of a plurality of operational points detected for each of the calculation cycles while the welding is performed. This eliminates the need for conducting e.g. experiments in order to set an approximating curve. Moreover, since it is possible to calculate an optimum approximating curve under a given welding conditions, the arc length control becomes even more stable.

Further, the voltage control setting value is calculated by modifying the voltage setting value with the deviation between the welding voltage and the welding voltage limit value, and the output of the welding power source is controlled with the amplified error value between the output voltage which is a voltage value at the point in the welding power source before the reactor and the voltage control setting value. As a result, if an abnormal voltage is superimposed, a corresponding output voltage is produced for compensating control, whereby sharp change of the welding current is prevented to keep the welding stable.

Further, the norm welding voltage or the norm characteristic is modified in accordance with the change of the voltage setting value. Accordingly, the abnormal voltage is removed with high response in the case that the voltage setting value changes.

Further, a norm characteristic suitable for the welding condition of various portions to be welded is set by providing various norm characteristics for a plurality of portions to be welded. Accordingly, stable output control is performed in welding each of the portions to be welded based on the welding voltage from which an abnormal voltage is properly removed.

BRIEF DESCRIPTION OF THE DRAWINGS

FIG. 15 is a chart showing voltage and current waveforms and describing a case where an abnormal voltage is superimposed on a welding voltage of pulse arc welding according to conventional art.

FIG. 16 is a waveform chart which illustrates a method of setting a norm voltage waveform in pulse arc welding according to the conventional art.

FIG. 17 is a voltage waveform chart which illustrates how an abnormal voltage is removed in a welding voltage of pulse arc welding according to the conventional art.

FIG. 18 is a chart showing voltage and current waveforms and describing an abnormal voltage in consumable electrode arc welding for describing problems.

DETAILED DESCRIPTION OF THE PREFERRED EMBODIMENT

Hereinafter, embodiments of the present invention will be described with reference to the drawings.

Embodiment 1

Figure 1:
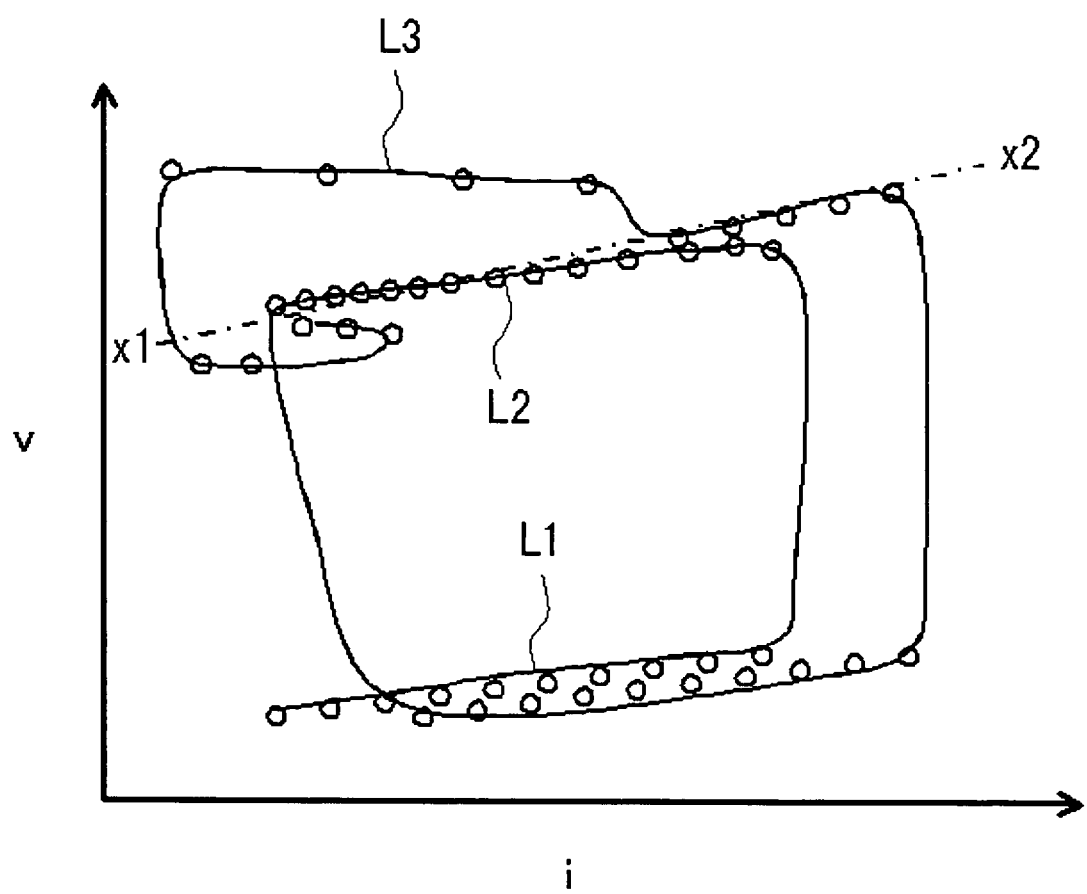
FIG. 1 is a chart showing current-voltage relation which and describing a principle of a method for removing abnormal voltages according to the present invention.

FIG. 1 shows a current-voltage relation and describes a principle of a method for removing abnormal voltages according to the present invention. The horizontal axis in the figure represents a welding current I whereas the vertical axis represents a welding voltage v. This figure includes circles indicating operational points of voltage and current waveform shown in FIG. 16 sampled at each minute time (from several tens of microseconds to several hundreds of microseconds). Hereinafter, explanation will be given with reference to this figure.

The curve L1 shows a trajectory of operational points during the short-circuit period Ts. The operational point moves on the curve from left to right as time passes. The curve L2 shows a trajectory of operational points during the arc period Ta. During the arc period Ta, the operational point moves from right to left as time passes. Then, the short-circuit period Ts begins again and the above-described operation is repeated. When an abnormal voltage occurs in the arc period Ta, the operation point moves along the curve L3 during the period the abnormal voltage generates. Since the normal arc period Ta with no abnormal voltage generated is represented by the curve L2, clear distinction is possible from those operational points in the time period in which an abnormal voltage is generated. Thus, it is possible to remove an abnormal voltage by assuming the trajectory of the operational points during the normal arc period Ta as x1-x2 (hereinafter referred to as norm operational point trajectory), and by treating operational points deviating from the norm operational point trajectory by a predetermined fluctuation range as occurrence of the abnormal voltage for limitation procedure. The norm operational point trajectory is calculated based on e.g. experiment for each set of welding conditions.

Figure 2:
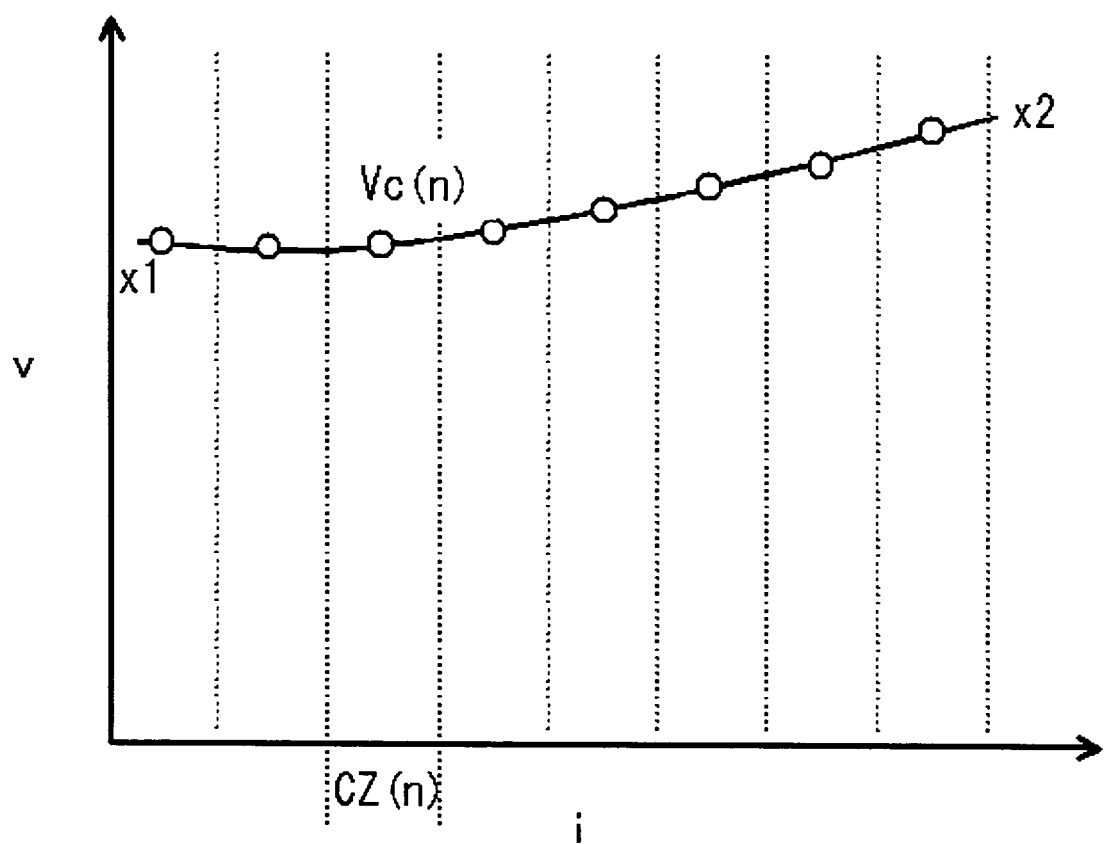
FIG. 2 is a chart showing current-voltage relation and describing a method for calculating a norm welding voltage value Vc(n) for each current zone from a norm operational point trajectory x1-x2 according to Embodiment 1 of the present invention.

FIG. 2 is a chart showing current-voltage relation and describes a method for calculating the norm welding voltage value Vc from the above-described norm operational point trajectory curve x1-x2. In the figure, the horizontal axis represents the welding current i whereas the vertical axis represents the welding voltage v. The norm operational point trajectory shown in the figure is the same as one described with reference to FIG. 1. As shown in FIG. 2, the entire range of the welding current i is divided into a plurality of current zones CZ(n). For example, if current zones of 25 A width are considered with regard to a welding power source of a 500 A current capacity, twenty current zones CZ(1)-CZ(20) are produced. As shown in the figure, a norm welding voltage value Vc(n) is set for each current zone CZ(n) on the norm operational point trajectory x1-x2. In other words, a current zone CZ(n) is selected in accordance with a detected welding current value i(n) for each time segment, which will then gives a norm welding voltage value Vc(n) for this particular current zone CZ(n). By limiting the welding voltage v(n) to within a fluctuation range Vc(n)±ΔVc which is set from the norm welding voltage value, it becomes possible to remove the abnormal voltage.

Figure 3:
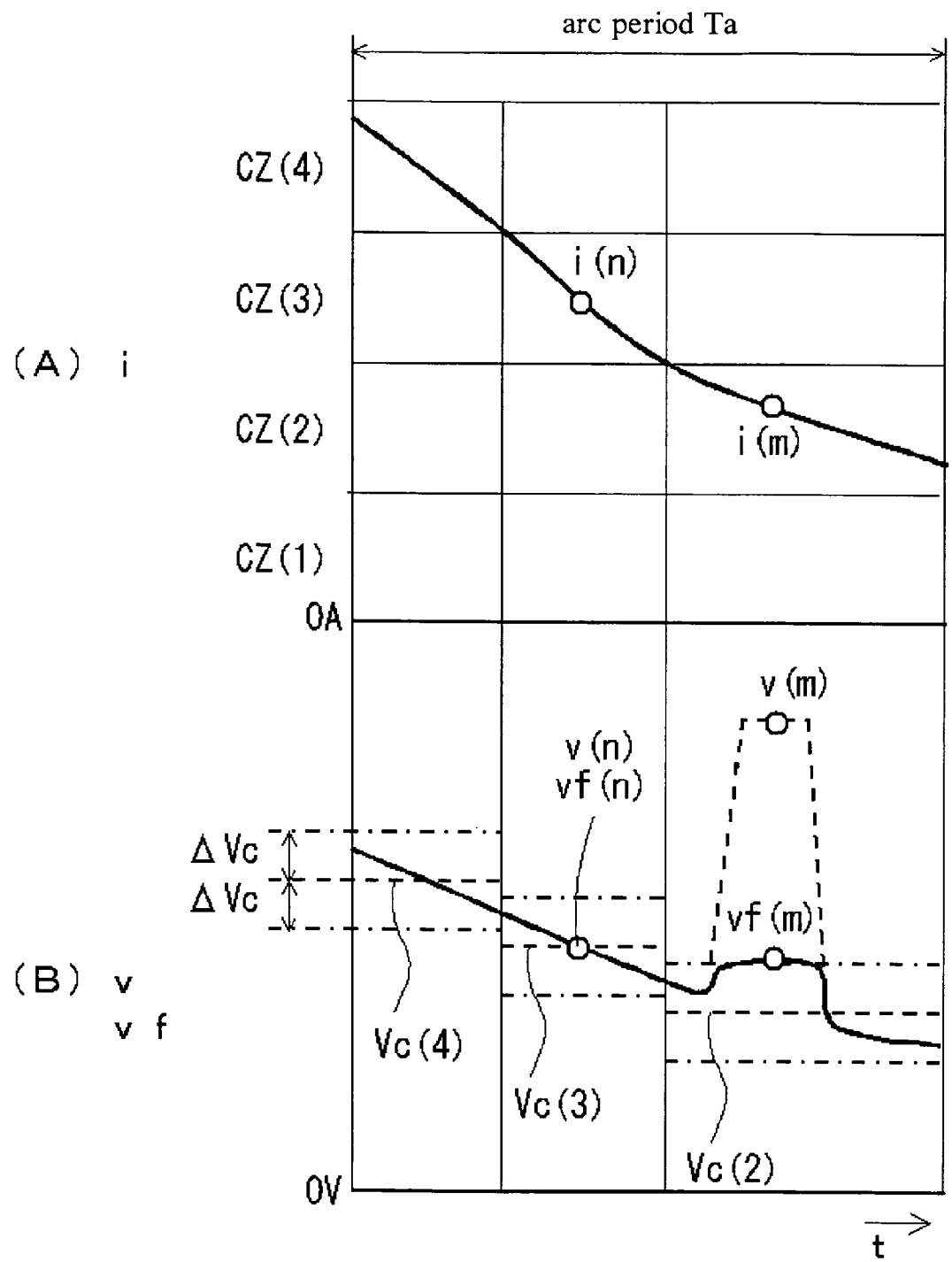
FIG. 3 is a chart showing current and voltage waveforms and describing an output control method for a consumable electrode arc welding power source according to Embodiment 1 of the present invention.

FIG. 3 is a chart showing current and voltage waveforms and illustrates a method of removing abnormal voltages according to Embodiment 1 of the present invention. A waveform of the welding current i during the arc period Ta is shown in (A) whereas a waveform of the welding voltage v and a waveform of the welding voltage limit value vf are shown in (B) by a broken line and a solid line, respectively. For the sake of easier understanding, (A) shows a case in which the current zone is divided into four segments CZ(1)-CZ(4). For each current zone, a norm welding voltage value is set to Vc(1)-Vc(4) by using the method described with reference to FIGS. 1 and 2. Each current zone has a fluctuation range of the same width, i.e. ±ΔVc; however, each current zone may have a different fluctuation range from others. As shown in (B), in each current zone, the broken line represents the norm welding voltage value while the dashed-dotted lines represent the upper limit value and the lower limit value of the fluctuation range. Measurement is performed for the welding current i and the welding voltage v, in each time segment.

As shown in the figure, when the welding current i(n) and the welding voltage v(n) are detected, the current zone CZ(3) is selected based on the value of the welding current i(n). By selecting the current zone CZ(3), the norm welding voltage value Vc(3) is identified and the fluctuation range Vc(3)±ΔVc is also identified. In this case, since the welding voltage v(n) is within the fluctuation range, the welding voltage limit value vf(n)=v(n).

Next, as shown in the figure, when the welding current i(m) and the welding voltage v(m) are detected, the current zone CZ(2) is selected based on the value of welding current i(m). Depending on the current zone CZ (m), the norm welding voltage value Vc(2) and then the fluctuation range Vc(2)±ΔVc are determined. In this case, since an abnormal voltage is superimposed and v(m)>Vc(2)+ΔVc hols true with regard to the welding voltage v(m), the welding voltage is limited to the welding voltage limit value vf(m)=Vc(2)+ΔVc. For example, if the abnormal voltage generates for a period of 5 ms and sampling interval of the minute time is 0.1 ms, the abnormal voltage is removed away from fifty sampling data.

Figure 4:
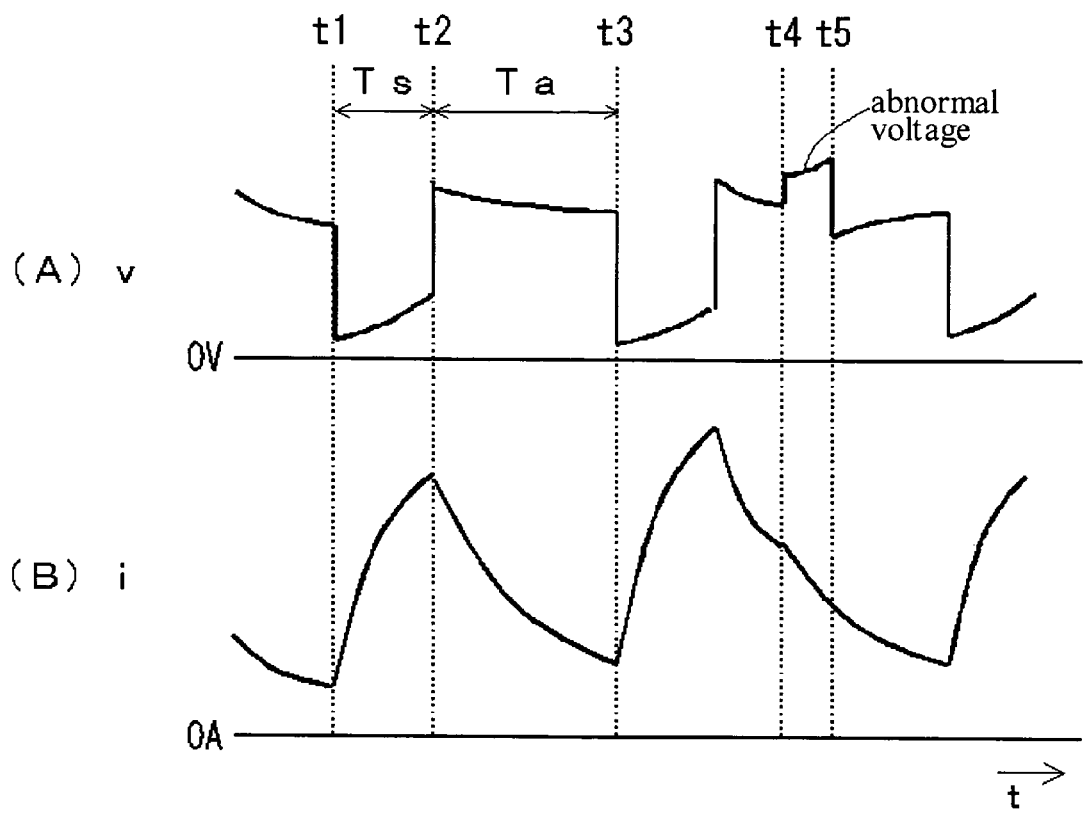
FIG. 4 is a chart showing voltage and current waveforms and describing how an abnormal voltage is removed according to Embodiment 1 of the present invention.

FIG. 4 is a waveform chart showing a case where the above-described method of removing abnormal voltages is applied to the voltage-current waveform in FIG. 18. As shown in (A), an abnormal voltage is interposed during the period between time points t4-t5. Though not illustrated, the abnormal voltage is removed by using the above-described method, and the welding voltage limit value vf is formed. Since the welding power source controls its output based on the welding voltage limit value vf, the welding current i changes in the substantially manner as in the normal case as shown in (B). As a result, the arc length is controlled stably, enabling to obtain good welding quality.

Figure 5:
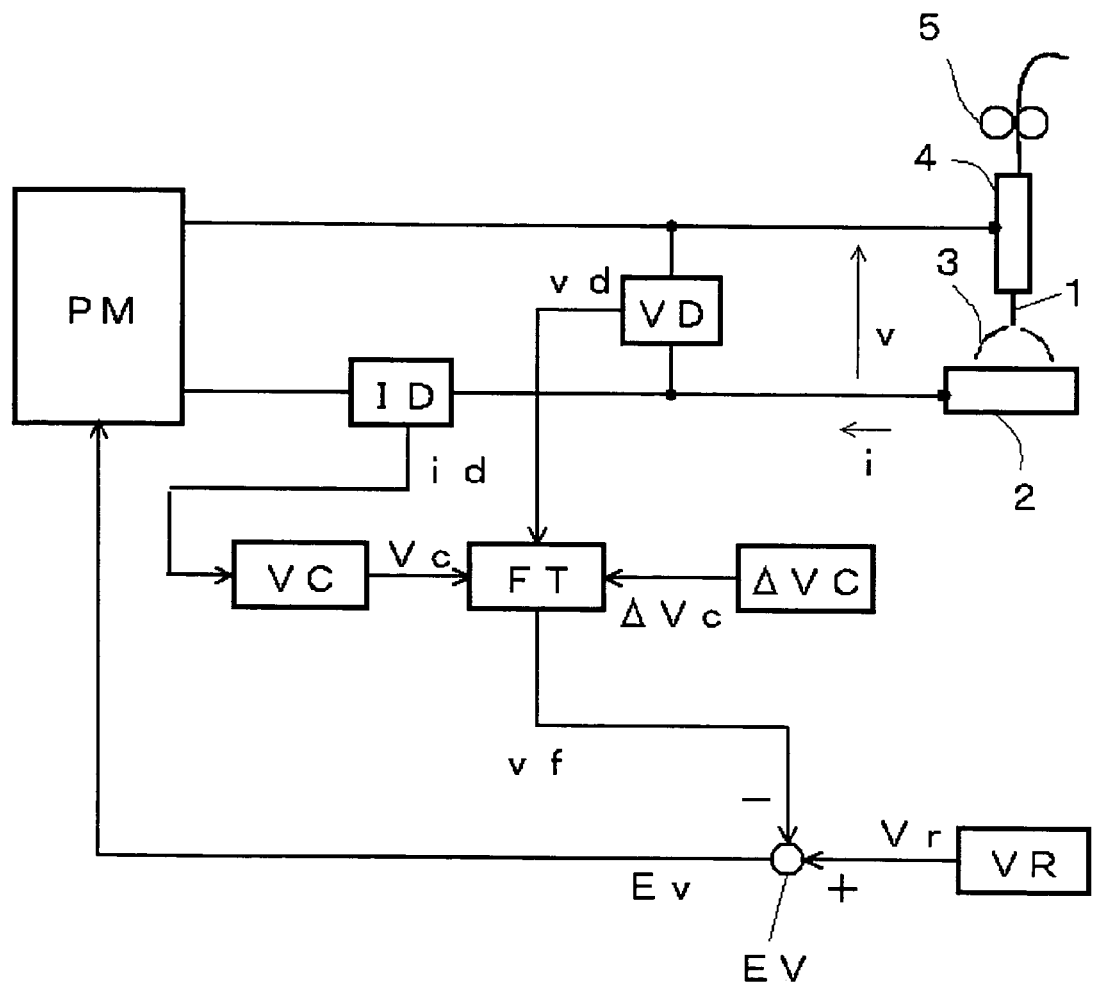
FIG. 5 is a block diagram of a consumable electrode arc welding power source according to Embodiment 1 of the present invention.

FIG. 5 is a block diagram of a consumable electrode arc welding power source according to Embodiment 1. Hereinafter, description will be made for each block with reference to the figure.

A power source main circuit PM receives power such as three-phase 200 V from a commercial power supply, and performs output control such as inverter control and thyristor phase control based on a voltage error amplification signal Ev described later to output a welding current i and a welding voltage v. A welding wire 1 is supplied through a welding torch 4 by rotation of feeding rolls 5 of a wire feeder, whereby an arc 3 generates between the wire and a base metal 2 to perform welding.

A current detection circuit ID samples the welding current i for each minute time and outputs a current detection signal id. A norm welding voltage value setting circuit VC, which stores a norm welding voltage value for each of the segmentalized current zones as described with reference to FIGS. 1 and 2, selects a norm welding voltage value that corresponds to the current detection signal id, and outputs a norm welding voltage value signal Vc. A voltage detection circuit VD samples the welding voltage v at the same time of sampling of the welding current i, and outputs a voltage detection signal vd. A fluctuation range setting circuit ΔVC outputs a predetermined fluctuation range setting signal ΔVc. A filter circuit FT limits, as described with reference to FIG. 3, the value of the voltage detection signal vd to within the fluctuation range Vc±ΔVc which is a range defined with respect to the norm welding voltage value, and outputs a welding voltage limit value signal vf.

A voltage setting circuit VR outputs a desired voltage setting signal Vr. A voltage error amplifying circuit EV amplifies an error between the voltage setting signal Vr and the welding voltage limit value signal vf to output a voltage error amplification signal Ev. Thus, by using the welding voltage limit value signal vf from which an abnormal voltage has been removed in the feedback control (arc length control) based on signals from the voltage error amplification circuit EV, a stable arc length control becomes possible.

Embodiment 2

Figure 6:
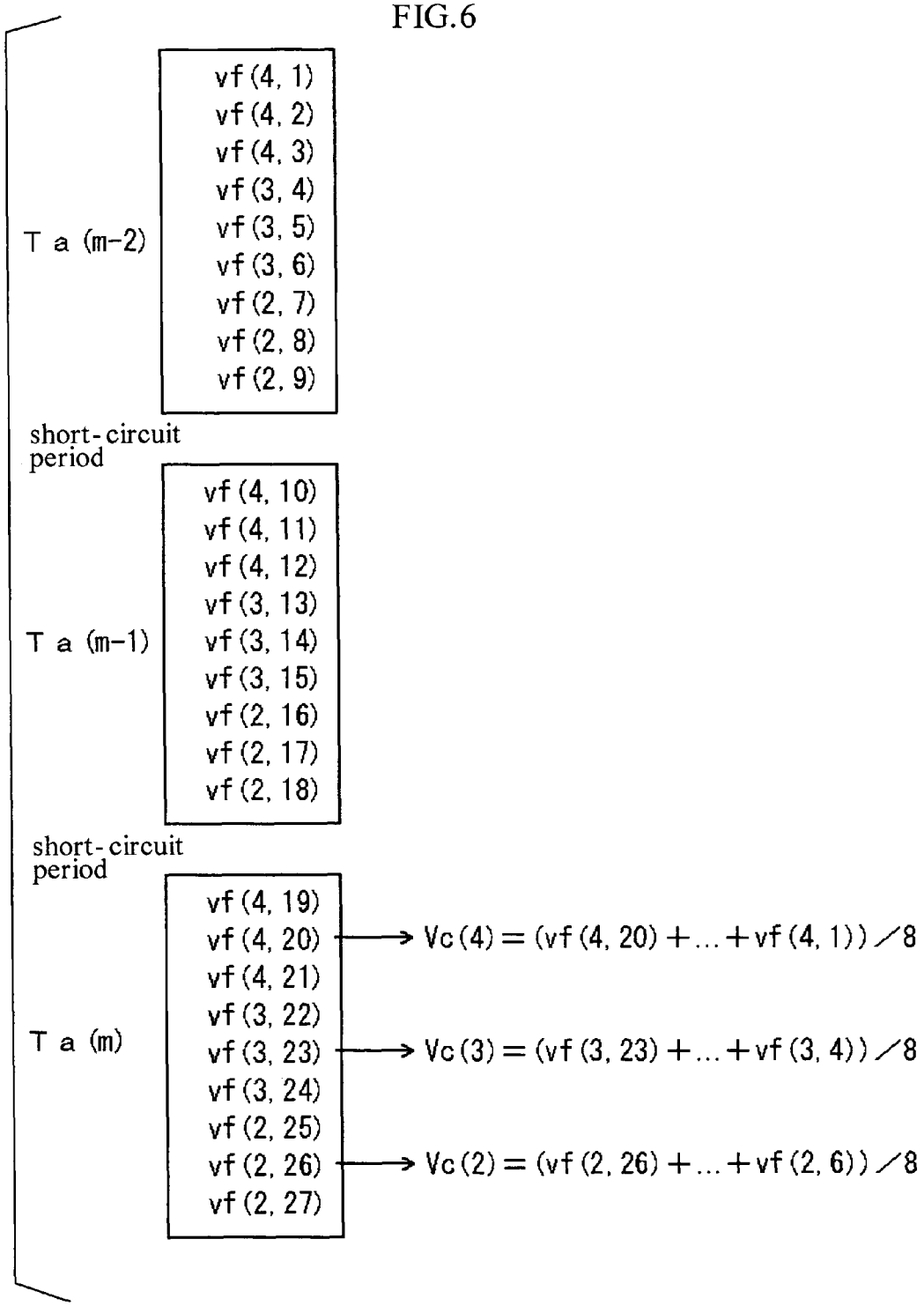
FIG. 6 illustrates a method of calculating a norm welding voltage value for each current zone by using a moving average according to Embodiment 2 of the present invention.

FIG. 6 illustrates a method of calculating a norm welding voltage value for each current zone by using a moving average while welding is underway according to Embodiment 2 of the present invention. The figure shows a case where the current zone is divided into four segments CZ(1)-CZ(4). For each minute time, a welding current i(n) and a welding voltage v(n) are detected, a current zone CZ(p) which corresponds to the welding current i(n) is selected, and the welding voltage limit value is set to a value vf(n). This relationship will be expressed as vf(p, n). The expression vf(p, n) represents that the n-th welding voltage limit value Vf(n) belongs to the current zone CZ(p).

Now, as shown in FIG. 6, assume that with a short-circuit period being sandwiched in between, there are three consecutive arc periods Ta(m−2) through Ta(m), with their welding voltage limit values being vf(4, 1) through vf(2, 27). Then, the norm welding voltage value Vc(4) for the current zone CZ(4) upon calculation of the vf(4, 20) is obtained by the following formula as a moving average of past data:

$$Vc(4)=(vf(4,20)+ \ldots +vf(4,1))/8$$

The above example is a case where a total of eight data in the past are used to obtain the moving average. The moving average is obtained from welding voltage limit values only in the same current zone. The calculated norm welding voltage value Vc(4) is used to limit the next v(21), and then to obtain vf(4, 21).

Likewise, the norm welding voltage value Vc(3) for the current zone CZ(3) at the time that vf(3, 23) is calculated is obtained by the following formula:

$$Vc(3)=(vf(3,23)+ \ldots +vf(3,4))/8$$

Further, the norm welding voltage value Vc(2) for the current zone CZ(2) at the time that vf(2, 26) is calculated is obtained by the following formula:

$$Vc(2)=(vf(2,26)+ \ldots +vf(2,6))/8$$

As described above, by obtaining a moving average of the welding voltage limit values vf for each current zone, the norm welding voltage value Vc in each current zone is calculated automatically. The moving average is obtained for the period from past a few tens of milliseconds to past a few hundreds of milliseconds.

Figure 7:
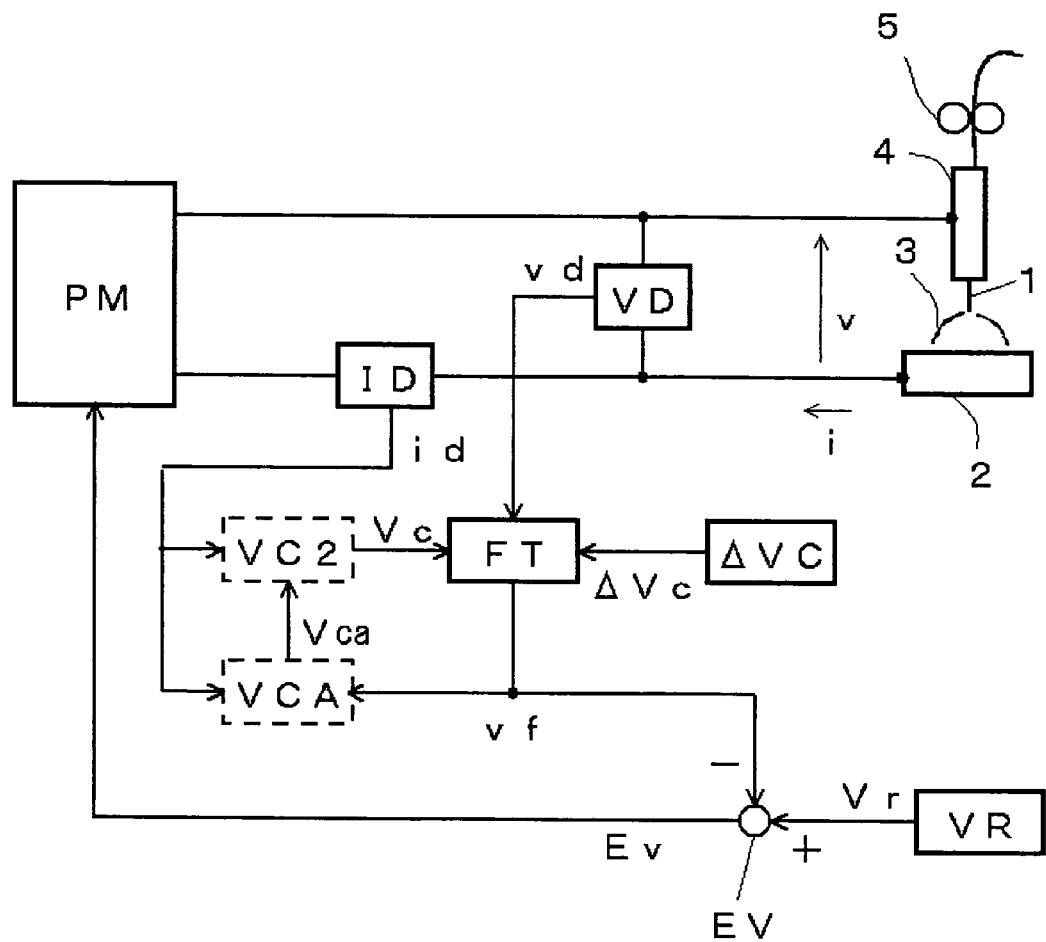
FIG. 7 is a block diagram of a consumable electrode arc welding power source according to Embodiment 2 of the present invention.

FIG. 7 is a block diagram of a consumable electrode arc welding power source according to Embodiment 2. In this figure, blocks which are identical to those in FIG. 5 are designated by the same references, and will not be given description. Hereinafter, description will be made for the blocks drawn in broken lines which are different from those in FIG. 5.

A norm welding voltage value calculation circuit VCA receives the current detection signal id and the welding voltage limit value signal vf as inputs, classifies the welding voltage limit value signal vf in accordance with the value of the corresponding current detection signal id which is detected simultaneously therewith as described with reference to FIG. 6, calculates a moving average for each current zone, and outputs a norm welding voltage value calculation signal Vca for each current zone. A second norm welding voltage value setting circuit VC2 stores the norm welding voltage value calculation signal Vca for each current zone as input, selects a norm welding voltage value of the current zone which corresponds to the current detection signal id, and outputs a norm welding voltage value signal Vc.

Embodiment 3

Figure 8:
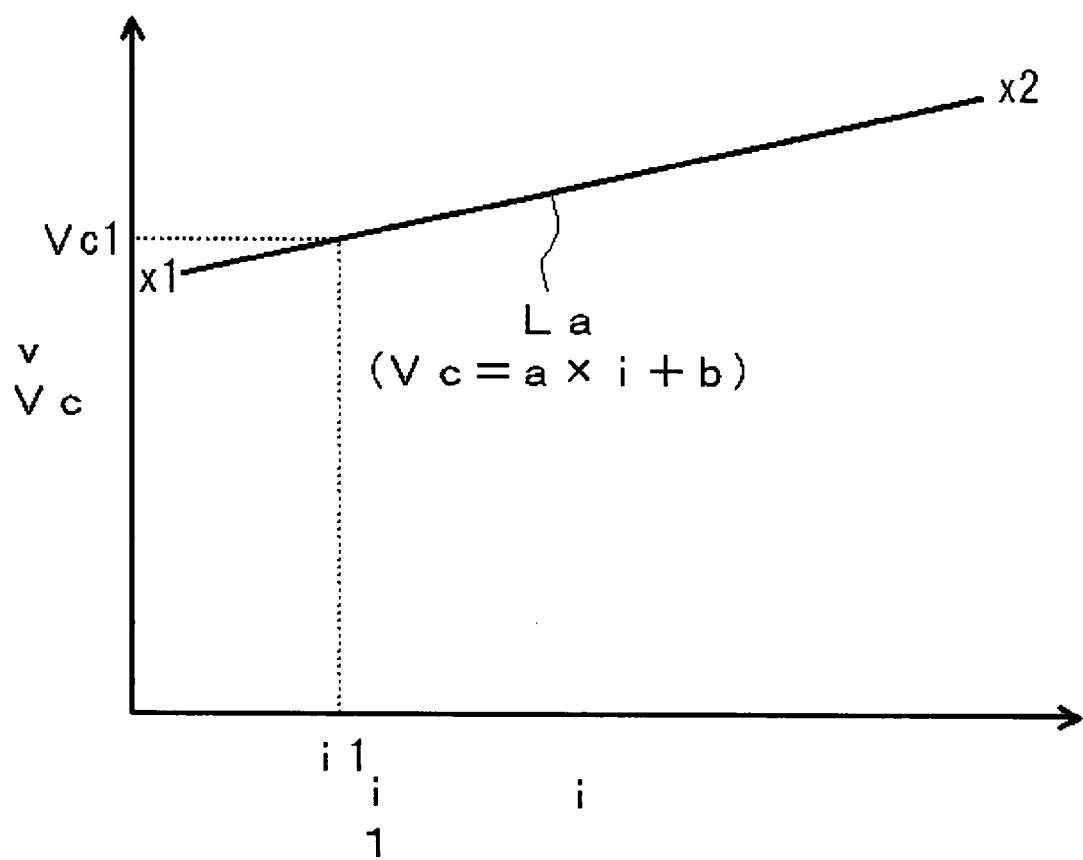
FIG. 8 is a chart showing current-voltage relation and illustrating a method of calculating a norm welding voltage value Vc from an approximating curve La to the norm operational point trajectory x1-x2 according to Embodiment 3 of the present invention.

FIG. 8 is a chart showing current-voltage relation and illustrates a method of Embodiment 3 of the present invention for calculating a norm welding voltage value Vc from the norm operational point trajectory x1-x2 described earlier with reference to FIG. 1. In the figure, the horizontal axis represents the welding current i whereas the vertical axis represents the welding voltage v and the norm welding voltage value Vc. The norm operational point trajectory x1-x2 in the figure is the same as one described with reference to in FIG. 1. As shown in the figure, the norm operational point trajectory x1-x2 is an arc characteristic curve which shows a relation between the welding current i and the welding voltage v during the time when an arc is generated. This norm operational point trajectory x1-x2 is approximated as an approximating curve La, which is used as a setting that represents a norm characteristic. The figure shows an example of a first-order approximation (linear approximation), and then the approximating curve La is expressed as Vc=a×i+b, where a and b are constants. Therefore, when the welding current is given, a corresponding norm welding voltage value Vc is determined. For example, when the welding current i=i1, the norm welding voltage value is Vc1=a×i1+b. The approximating curve La may be a second-order or higher-order approximation of the norm operational point trajectory x1-x2.

Figure 9:
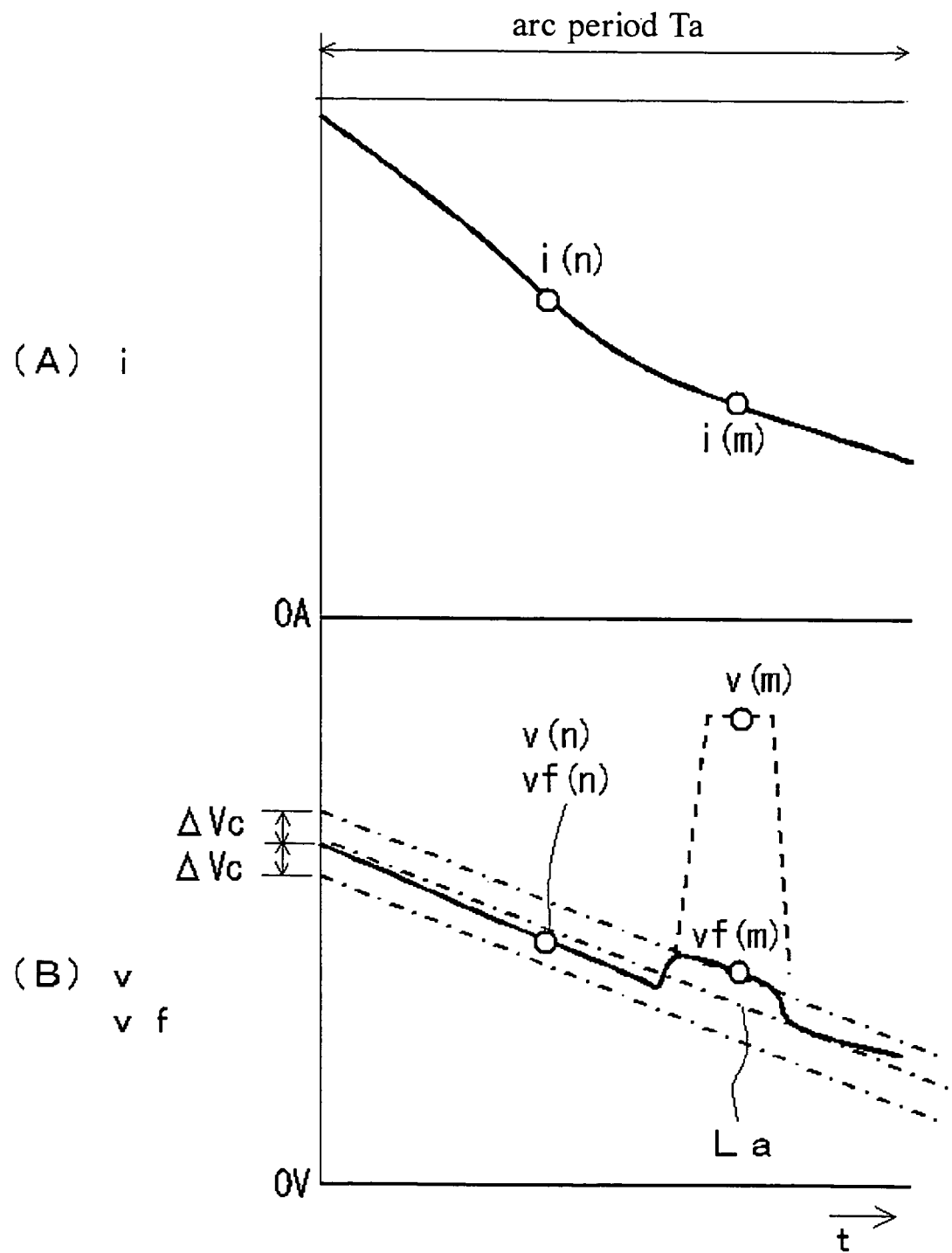
FIG. 9 is a chart showing current and voltage waveforms and illustrating an output control method for a consumable electrode arc welding power source according to Embodiment 3 of the present invention.

FIG. 9 is a chart showing current and voltage waveforms and illustrates a method of removing abnormal voltages according to Embodiment 3 of the present invention. In the figure, a waveform of the welding current i in the arc period Ta is shown in (A) whereas waveforms of the welding voltage v and the welding voltage limit value vf are shown in (B) with broken and solid lines, respectively. In (B), A dashed-dotted line represents the approximating curve La(Vc=a×i+b) described with reference to FIG. 8 whereas dashed-dotted lines above and below indicate the fluctuation range Vc±ΔVc.

As shown in the figure, when a welding current i(n) and a welding voltage v(n) are detected, a norm welding voltage value Vc(n)=a×i(n)+b is calculated from the value of the welding current i(n), and a fluctuation range Vc(n)±ΔVc is determined. In this case, since the welding voltage v(n) is within the fluctuation range, the welding voltage limit value is vf(n)=v(n).

Next, as shown in the figure, when a welding current i(m) and a welding voltage v(m) are detected, a norm welding voltage value Vc(m)=a×i(m)+b is calculated from the value of the welding current i(m), and a fluctuation range Vc(m)±ΔVc is determined. In this case, since an abnormal voltage is superimposed and v(m)>Vc(m)+ΔVc holds true with regard to the welding voltage v(m), the welding voltage limit value vf(m) is limited to the welding voltage limit value vf(m)=Vc(m)+ΔVc. For example, when the abnormal voltage generates for a period of 5 ms and sampling interval of the minute time is 0.1 ms, the abnormal voltage is removed away from a total of fifty sampling data.

Figure 10:
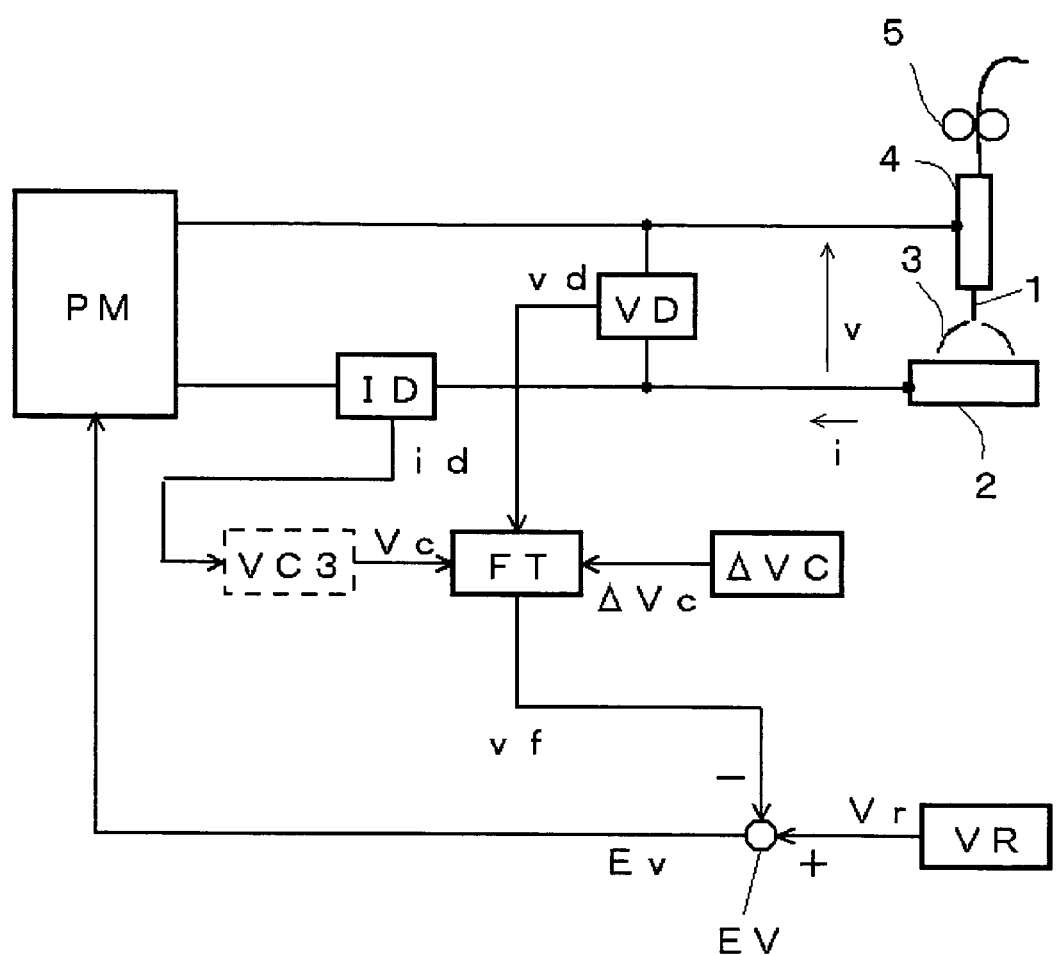
FIG. 10 is a block diagram of a consumable electrode arc welding power source according to Embodiment 3 of the present invention.

FIG. 10 is a block diagram of a consumable electrode arc welding power source according to Embodiment 3. In this figure, the same blocks as already described with reference to FIG. 5 are indicated with the same reference signs, and the description will not be repeated. Hereinafter, description will be give to the blocks drawn in broken lines, which are different from those in FIG. 5.

A third norm welding voltage value setting circuit VC3 stores the approximating curve La of the norm operational point trajectory described with reference to FIG. 8, receives the current detection signal id as an input, calculates a norm welding voltage value on the approximating curve La, and outputs a norm welding voltage value signal Vc.

In the above-described Embodiment 3, it is possible to remove abnormal voltages by setting the approximating curve La of the norm operational point trajectory, calculating the fluctuation range Vc±ΔVc of the norm welding voltage value, and then by limiting the welding voltage detected value vd to within this fluctuation range.

Embodiment 4

Figure 11:
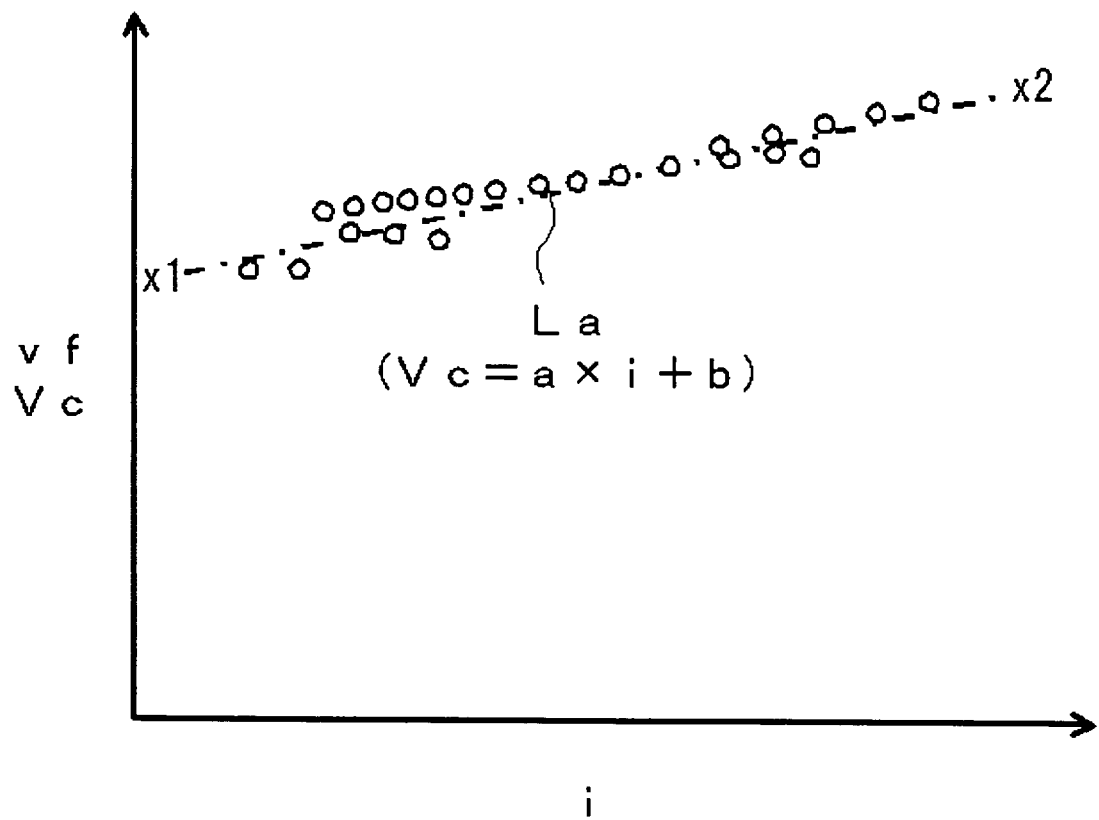
FIG. 11 is a chart showing current-voltage relation and illustrating a method of calculating an approximating curve La in FIG. 8 according to Embodiment 4 of the present invention.

FIG. 11 shows a current-voltage relation and describes a method according to Embodiment 4 of the present invention for sequentially calculating and updating the approximating curve La of the norm operational point trajectory x1-x2 described with reference to FIG. 8 while welding is underway. In the figure, the horizontal axis represents the welding current i whereas the vertical axis represents the welding voltage limit value vf and the norm welding voltage value Vc. The figure includes circles indicating operational points of the welding current i and the welding voltage limit value vf in the arc period in each predetermined calculation interval. The operational points are calculated as a combination of the welding current i and the welding voltage limit value vf for each minute cycles. The calculation cycle is set to a range from a few tens of milliseconds to a few seconds for example. For each calculation cycle, an approximating curve La is calculated from a plurality of operational points detected as input data. If the approximating curve La is by first-order approximation and is thereby expressed as Vc=a×i+b, values a and b are re-calculated and updated in each calculation cycle.

Figure 12:
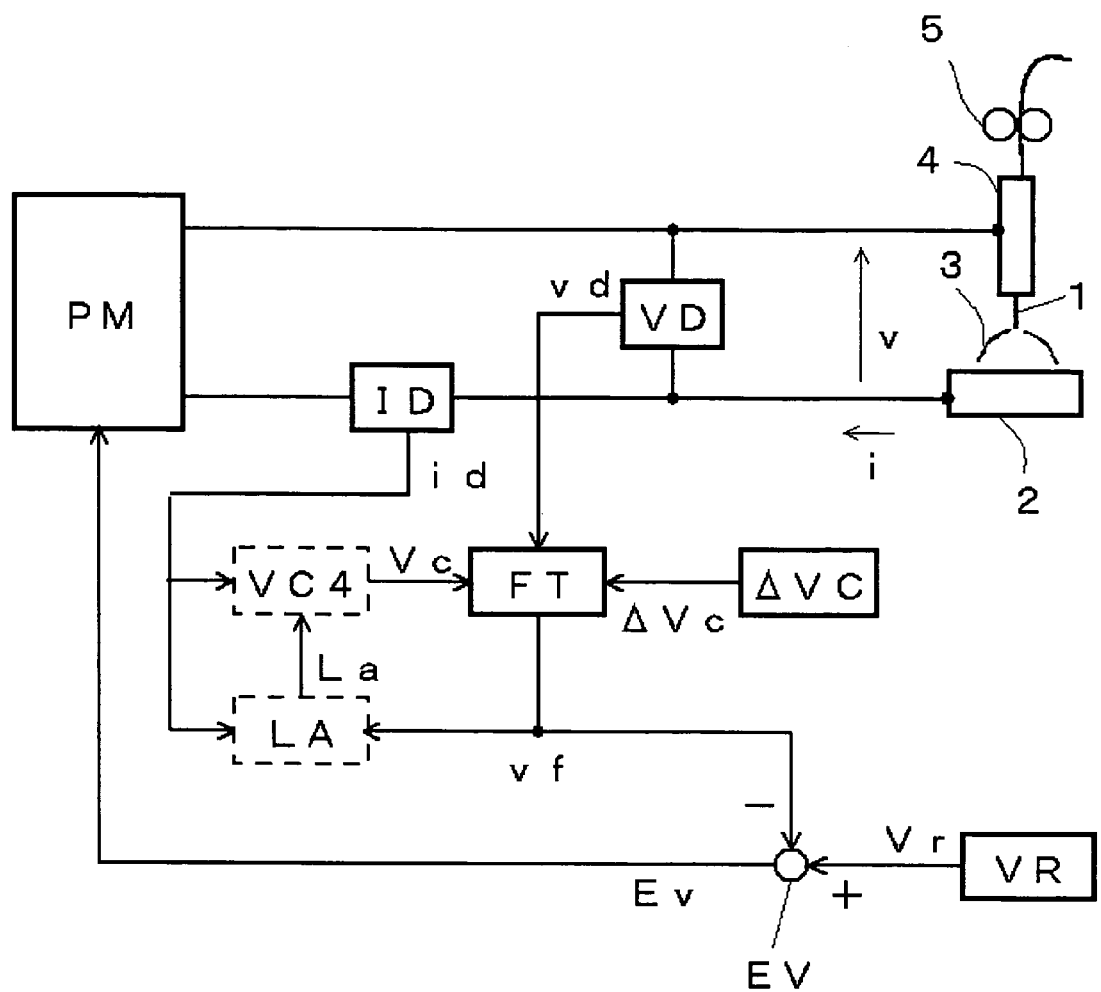
FIG. 12 is a block diagram of a consumable electrode arc welding power source according to Embodiment 4 of the present invention.

FIG. 12 is a block diagram of a consumable electrode arc welding power source according to Embodiment 4. In this figure, blocks which are identical with those in FIG. 5 are indicated with the same reference signs, and will not be described here. Hereinafter, description will be made for the blocks drawn in broken lines which are different from those in FIG. 5.

An approximating curve calculation circuit LA receives the current detection signal id and the welding voltage limit value signal vf as input, calculates an approximating curve for each predetermined calculation cycle from operation points in the arc period within the calculation cycle, and outputs an approximating curve setting signal La. The approximating curve setting signal La is formed with constants a and b if the approximating curve is by first-order approximation. A fourth norm welding voltage value setting circuit VC4 receives the approximating curve setting signal La as an input, calculates a norm welding voltage value which corresponds to the value of the current detection signal id on the approximation curve, and outputs a norm welding voltage value signal Vc.

According to Embodiment 4 described above, it is possible to calculate and update the approximation curve La described in Embodiment 3 continually while the welding is underway. This enables to reduce the time for setting because it eliminates the need for conducting e.g. experiments in order to find an approximation curve which otherwise is necessary for each different set of welding conditions. Further, this enables to optimize the approximation curve in accordance with changing states of the welding, and therefore to remove the abnormal voltage accurately, making possible to perform good welding.

Embodiment 5

Figure 13:
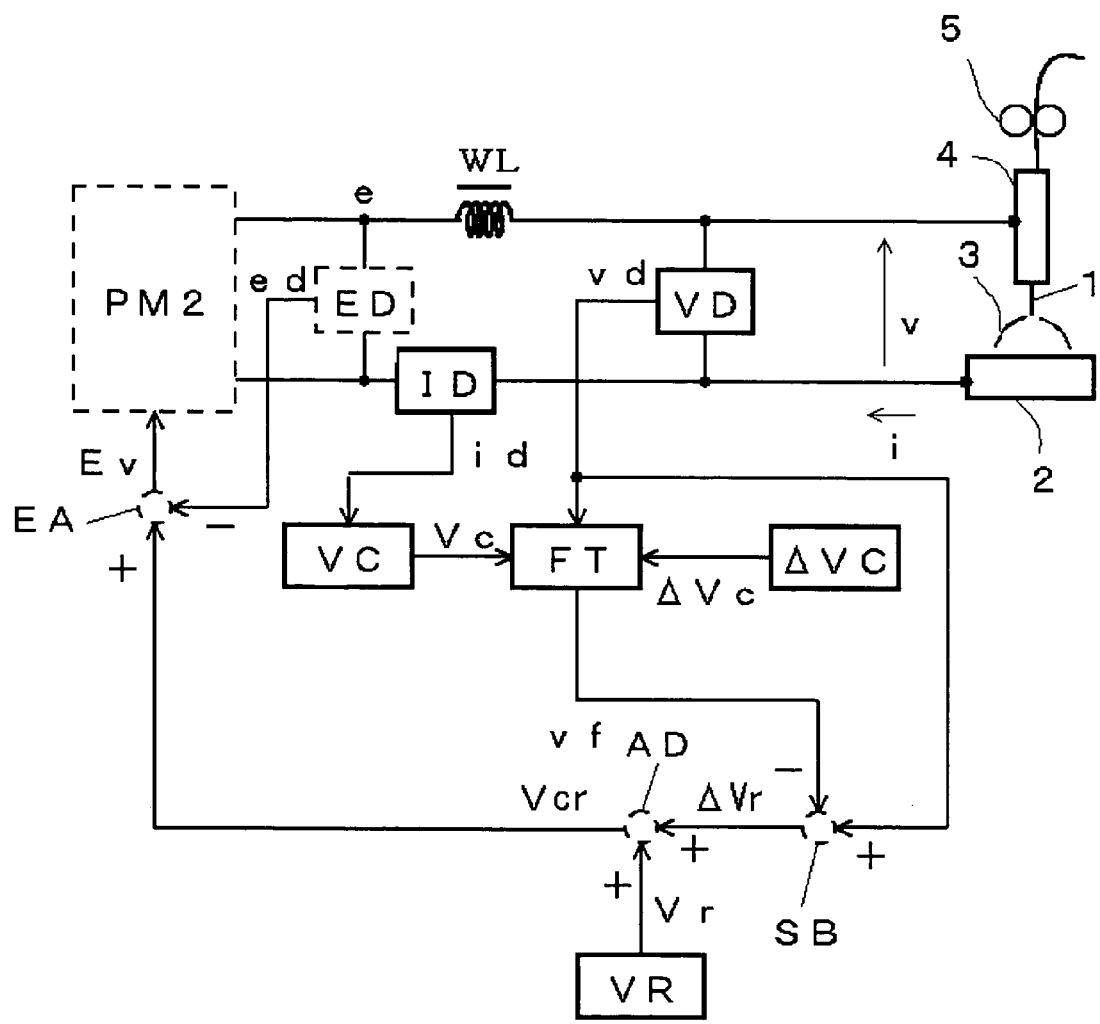
FIG. 13 is a block diagram of consumable electrode arc welding power source according to Embodiment 5 of the present invention.

FIG. 13 is a block diagram of a consumable electrode arc welding power source according to Embodiment 5 of the present invention. In the figure, the blocks identical to those of the FIG. 5 described above are designated by the same reference signs and will not be given description. The welding power sources according to Embodiments 1 through 4 described above perform feedback of the welding voltage v which is a voltage value passed through a reactor that is not illustrated and included in the power source main circuit PM for output control. In other words, the welding voltage v is a voltage between output terminals of the welding power source as well as a voltage between the welding wire and the base material. Accordingly, Embodiments 1 through 4 employ feedback of the welding voltage limit value vf obtained by removing an abnormal voltage from the welding voltage v in order to keep welding stable. On the other hand, Embodiment 5 employs a welding power source performing feedback control of the output voltage e which is a voltage at the portion before a reactor. Hereinafter, description will be given with regard to the blocks of broken lines which is different from FIG. 5.

A second power source main circuit PM2 excludes a reactor WL which is the same as one included in the power source main circuit PM shown in FIG. 5, and operates similarly or outputs an output voltage e by control of output such as inverter control based on a amplified voltage error signal Ev. The reactor WL outputs a smoothed output voltage e to apply it between a welding wire 1 and a base material 2. The inductance value of the reactor WL for smoothing may be small when the inverter control frequency of the second power source main circuit PM2. Accordingly, if the wiring of the output path in the welding power source shows inductance enough for smoothing, the wiring acts as the reactor WL equivalently. The description "reactor" in claims means not only a reactor including an iron core around which a cable winds but also a reactor constituted of the wiring of the output path.

A deviation calculating circuit SB calculates a deviation between a voltage detection signal vd (welding voltage v) and the welding voltage limit value signal vf, and outputs a deviation signal ΔVr=K(vd−vf), where K is a predetermined coefficient. An adding circuit AD adds the deviation signal ΔVr to a predetermined voltage setting signal Vr, and outputs a voltage control setting signal Vcr=Vr+ΔVr. An output voltage detecting circuit ED detects the above output voltage e and outputs an output voltage detection signal ed. An output voltage error amplifying circuit EA amplifies an error between the above voltage control setting signal Vcr and the above output voltage detection signal ed, and a voltage error amplifying signal Ev. In the figure, the method to remove an abnormal voltage superimposed on the welding voltage v to generate the welding voltage limit value signal vf is same as one in FIG. 5.

Figure 14:
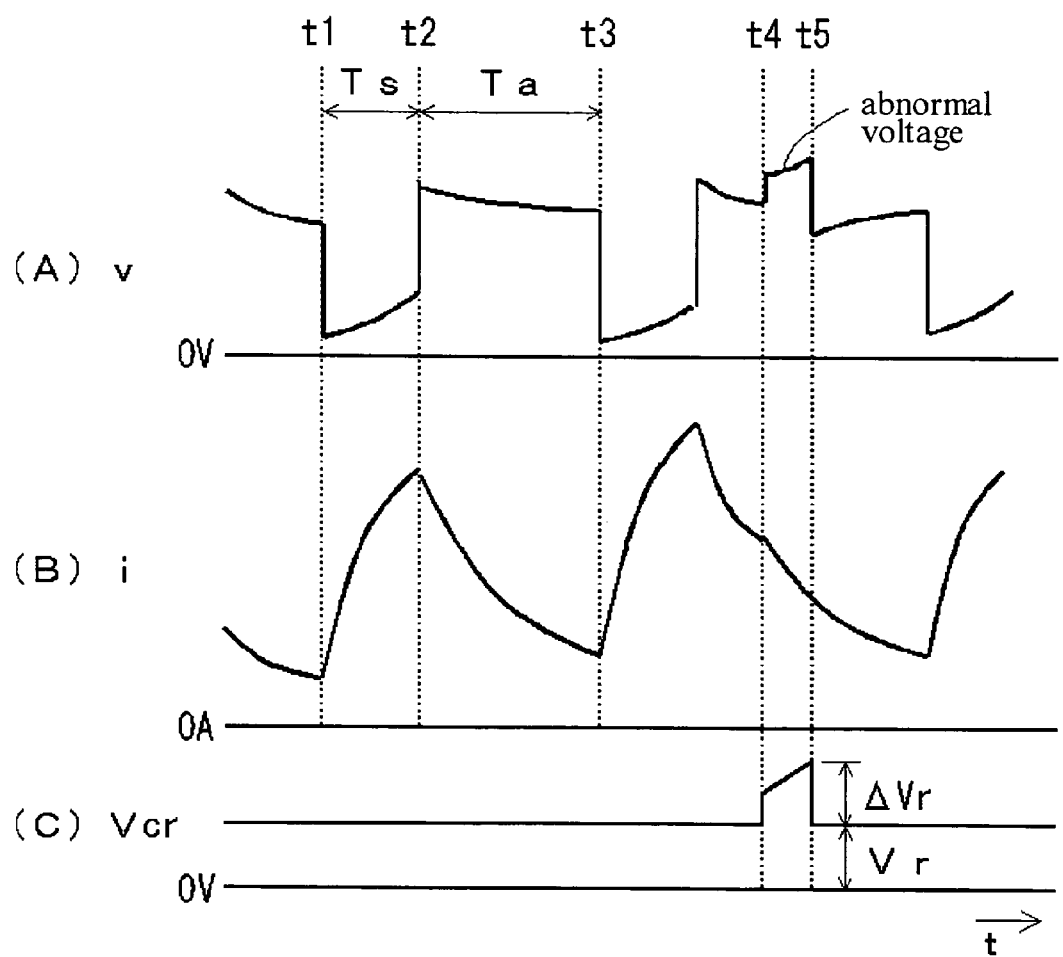
FIG. 14 is a timing chart illustrating operation of the welding power source shown in FIG. 13.

FIG. 14 is a timing chart showing operation of the welding power source described above. In the figure, the welding voltage v is shown in (A), the welding current i is shown in (B), and the voltage control setting signal Vcr is shown in (C). This figure corresponds to FIG. 4 described above. Hereinafter, description will be given with regard to the figure.

At periods except from t4 to t5, the welding voltage v is equal to the welding voltage limit value vf because an abnormal voltage does not generate. Accordingly, as shown in (C), the voltage control setting signal Vcr is equal to the voltage setting signal Vr. During this period, thereby, the output voltage e is constant-voltage-controlled by the value of the voltage setting signal Vr.

Next, during the period from t4 to t5, an abnormal voltage is superimposed as shown in (A). This produce the deviation signal $\Delta Vr=K(vd-vf)>0$, whereby the voltage control setting signal $Vcr=Vr+\Delta Vr$ increases by the abnormal voltage. As a result, the output voltage increases during this period, whereby, even in the case that an abnormal voltage generates, the welding current i changes smoothly without sharp change as in conventional techniques, which keeps welding stable.

In the above paragraphs, the method of Embodiment 1 (FIG. 5) is employed as generation of the welding voltage limit value signal vf. However, the methods of Embodiment 2 through 4 may be used.

With Embodiment 5 described above, the voltage control setting value is calculated by modifying the voltage setting value with the deviation between the welding voltage and the welding voltage limit value. Accordingly, even if an abnormal voltage is superimposed, the output voltage is controlled based on it, whereby sharp change of the welding current is prevented to keep welding stable.

Embodiment 6

In Embodiments 1 and 2 described above, when the voltage setting value $Vr=Vr1$, the norm welding voltage values in each of the current zones are as follows:

$Vc(0), Vc(2), \ldots Vc(n) \ldots, Vc(20)$

When the voltage setting value Vr changes from Vr1 to Vr2 by $\Delta Vr$, the above norm welding voltage values is replaced with:

$Vc(0)+K\Delta Vr, Vc(2)+K\Delta Vr, \ldots Vc(n)+K\Delta Vr \ldots,$
$Vc(20)+K\Delta Vr$ where coefficient K is a constant approximately from 0.1 to 3.0.

As described above, with Embodiment 6, the norm welding voltage value Vc is set to the neighborhood of the proper value by modifying the norm welding voltage value Vc in response to change of the voltage setting value Vr, whereby an abnormal voltage is properly removed.

Embodiment 7

In Embodiments 3 and 4 described above, the norm characteristic in the case of the voltage setting value $Vr=Vr1$ is as follows:

$Vc=a\times i+b$

When the voltage setting value Vr changes from Vr1 to Vr2 by $\Delta Vr$, the above norm characteristic is replaced with:

$Vc=a\times i+b+K\Delta Vr$ where coefficient K is a constant approximately from 0.1 to 3.0.

As described above, with Embodiment 7, the norm characteristic is set to the neighborhood of the proper value by modifying the norm characteristic in response to change of the voltage setting value Vr, whereby an abnormal voltage is properly removed.

Embodiment 8

In the case that there are a plurality of portions to be welded and the welding conditions are different for each of the portions to be welded, it is desirable to set the norm characteristic in Embodiments 3, 4, and 7 described above differently for the portions to be welded. For example, the norm characteristic for the portion 1 to be weld is set to $Vc=a10\times i+b10$, the norm characteristic for the portion 2 to be weld is set to $Vc=a20\times i+b20$, and the norm characteristic for the portion 3 to be weld is set to $Vc=a30\times i+b30$. As described above with reference to Embodiment 4, in the case that the norm characteristic is updated by an approximating curve while welding is performed, the norm characteristic for each of the portions to be welded is updated. For example, the norm characteristic for the portion 1 to be weld is updated to $Vc=a11\times i+b11$ and the norm characteristic for the portion 2 to be weld is updated to $Vc=a21\times i+b21$ at the first time while welding is performed, and then at the second time, the norm characteristic for the portion 1 to be weld is set to $Vc=a11\times i+b11$ by recalling the norm characteristic or the updated value at the starting time of welding and the norm characteristic for the portion 2 to be weld is set to $Vc=a21\times i+b21$ by recalling the updated value at the starting time of welding.

Description in Embodiments 1 through 8 takes a case of short-circuited arc welding. However, the present invention is also applicable to globular transfer arc welding, spray transfer arc welding, consumable electrode AC arc welding, and so on. Further, the present invention is applicable to consumable electrode pulse arc welding.

The invention claimed is:

1. An output control method for a consumable electrode arc welding power source in which an output of the welding power source is controlled based on an amplified error value between a predetermined voltage setting value and a welding voltage, the method comprising:

segmentalizing a continuously changing portion, in an arc period, of a welding current into a plurality of current zones of equal current width including a first current zone and a second current zone, and the welding current changes continuously over the entire arc period, setting a norm welding voltage value for each of the current zones, detecting a welding current and a welding voltage at each of minute cycles, selecting one of the current zones which corresponds to a value of the detected welding current, calculating a fluctuation range with the norm welding voltage value of the selected current zone as a center value, calculating a welding voltage limit value while the detected value of the welding voltage is limited to within the fluctuation range, calculating the amplified error value using the voltage setting value and the welding voltage limit value and generating an error amplification signal, and directing the error amplification signal to the welding power source to control the output, wherein the fluctuation range within each of the first current zone and the second current zone is constant, and the fluctuation range in the first current zone differs from the fluctuation range in the second current zone.

2. The method according to claim 1, wherein a moving average of the welding voltage limit values is obtained for each of the current zones for the calculation of the norm welding voltage value for each of the current zones.

3. The method according to claim 1, wherein an output voltage which is a voltage at a point on a output path in the welding power source before the reactor mounted on the output path is detected, a deviation between the detected value of the welding voltage and the welding voltage limit value is calculated, a voltage control setting value is calculated by adding the deviation to the voltage setting value, and the amplified error value is calculated using the voltage control setting value and the detected value of the output voltage.

4. The method according to claim 1, wherein each of the norm welding voltage values in all of the current zones is modified based on a change amount of the voltage setting value in the case that the voltage setting value changes.

5. An output control method for a consumable electrode arc welding power source in which an output of a welding power source is controlled based on an amplified error value between a predetermined voltage setting value and a welding voltage, the method comprising:
    forming a norm operational point trajectory which indicates a relation between a welding current and welding voltage during an arc period while no abnormal voltage is superimposed on the welding voltage,
    detecting a welding current and a welding voltage at each of minute cycles,
    calculating a norm welding voltage value which corresponds to a detected value of the welding current based on the norm operational point trajectory,
    calculating a fluctuation range with the norm welding voltage value as a center value,
    calculating a welding voltage limit value while the detected value of the welding voltage is limited to within the fluctuation range,
    calculating the amplified error value using the voltage setting value and the welding voltage limit value and generating an error amplification signal,
    directing the error amplification signal to the welding power source to control the output,
    wherein the norm operational point trajectory is calculated as a continuously changing linear line represented as $Vc = a \times i + b$, where $Vc$ is welding voltage; $i$ is welding current; and $a$ & $b$ are constants, for each of predetermined calculation cycles while welding is performed using operational points data constituted from the detected value of the welding current and the corresponding welding voltage value in each of the minute cycles while no abnormal voltage is superimposed on the welding voltage.

6. The method according to claim 5, wherein the norm operational point trajectory is modified toward a direction of a welding voltage axis based on a change amount of the voltage setting value in the case that the voltage setting value changes.

7. The method according to claim 5, wherein the norm operational point trajectory is set differently for a plurality of portions to be welded.

* * * * *